HAL STRATTON
ROBERT F. BAUER
ALMERON J. FIELD
ROBERT C. CROOKE
INVENTORS

BY Christie, Parker & Hale
ATTORNEYS

Dec. 7, 1965  H. STRATTON ETAL  3,221,506
SUPPORT STRUCTURES
Original Filed April 27, 1959  13 Sheets-Sheet 3
Fig. 5.
Fig. 4.
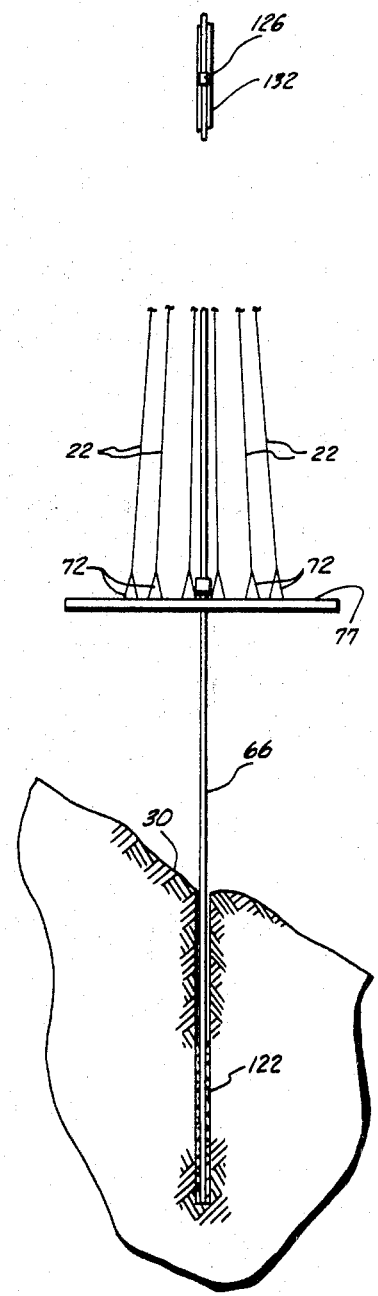
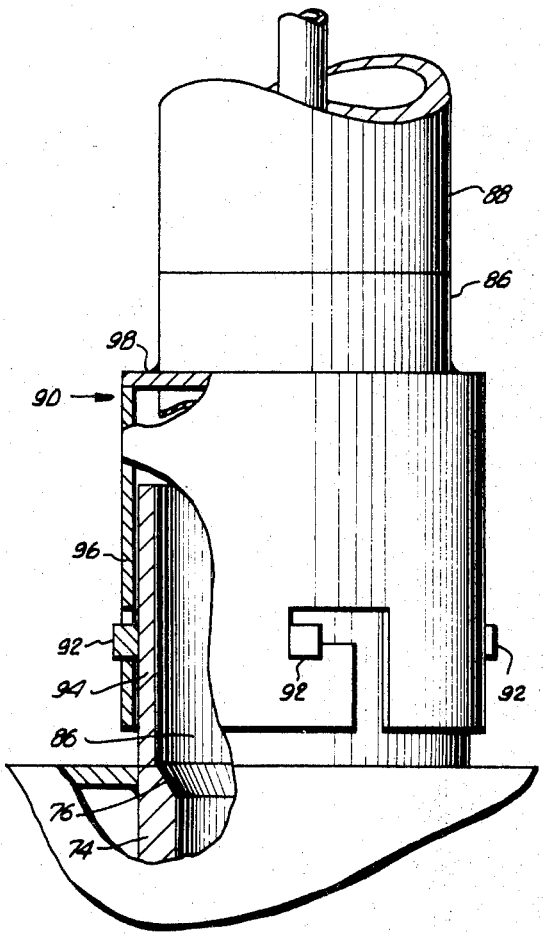
HAL STRATTON
ROBERT F. BAUER
ALMERON J. FIELD
ROBERT C. CROOKE
INVENTORS
BY Christie, Parker & Hale
ATTORNEYS.

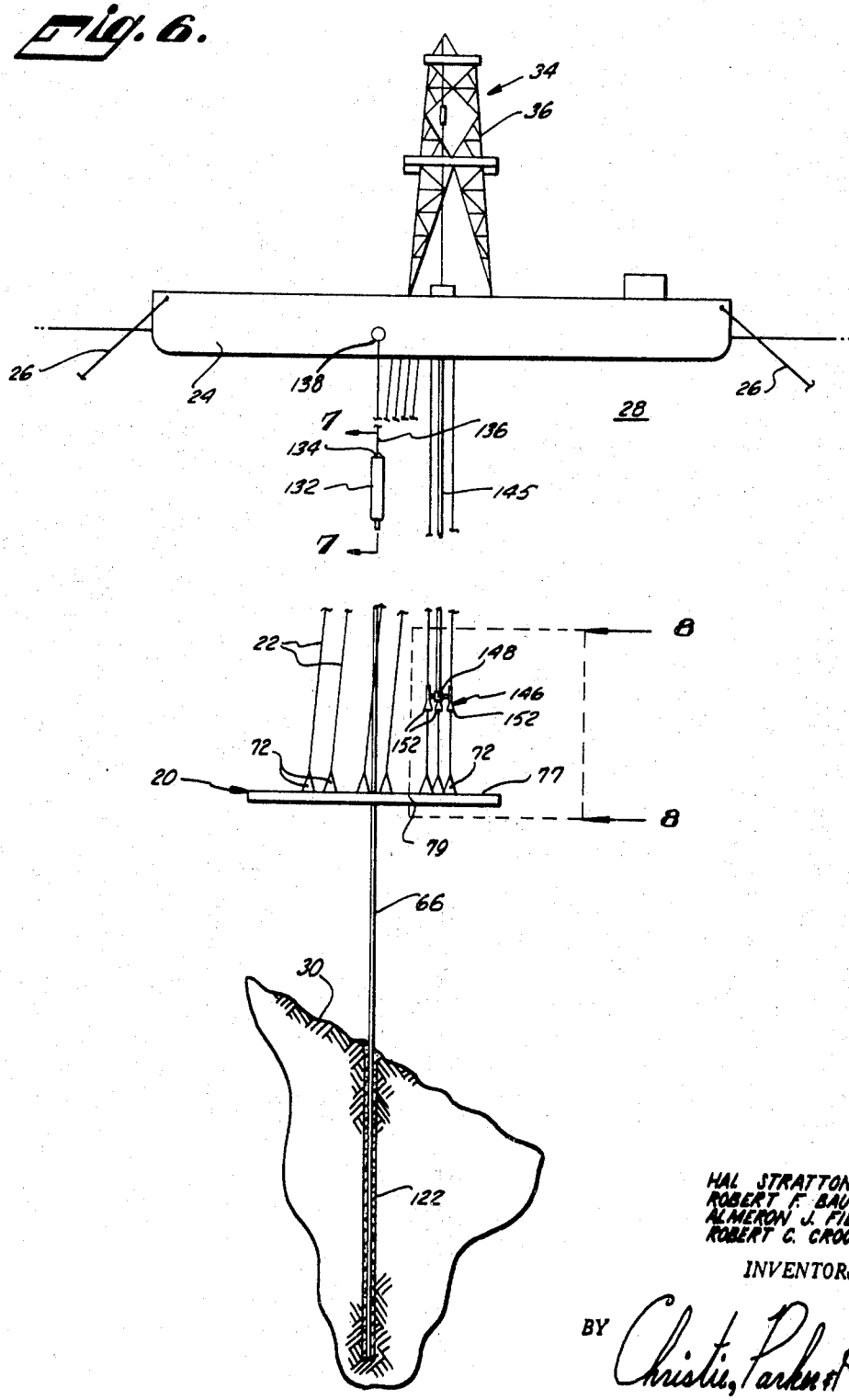

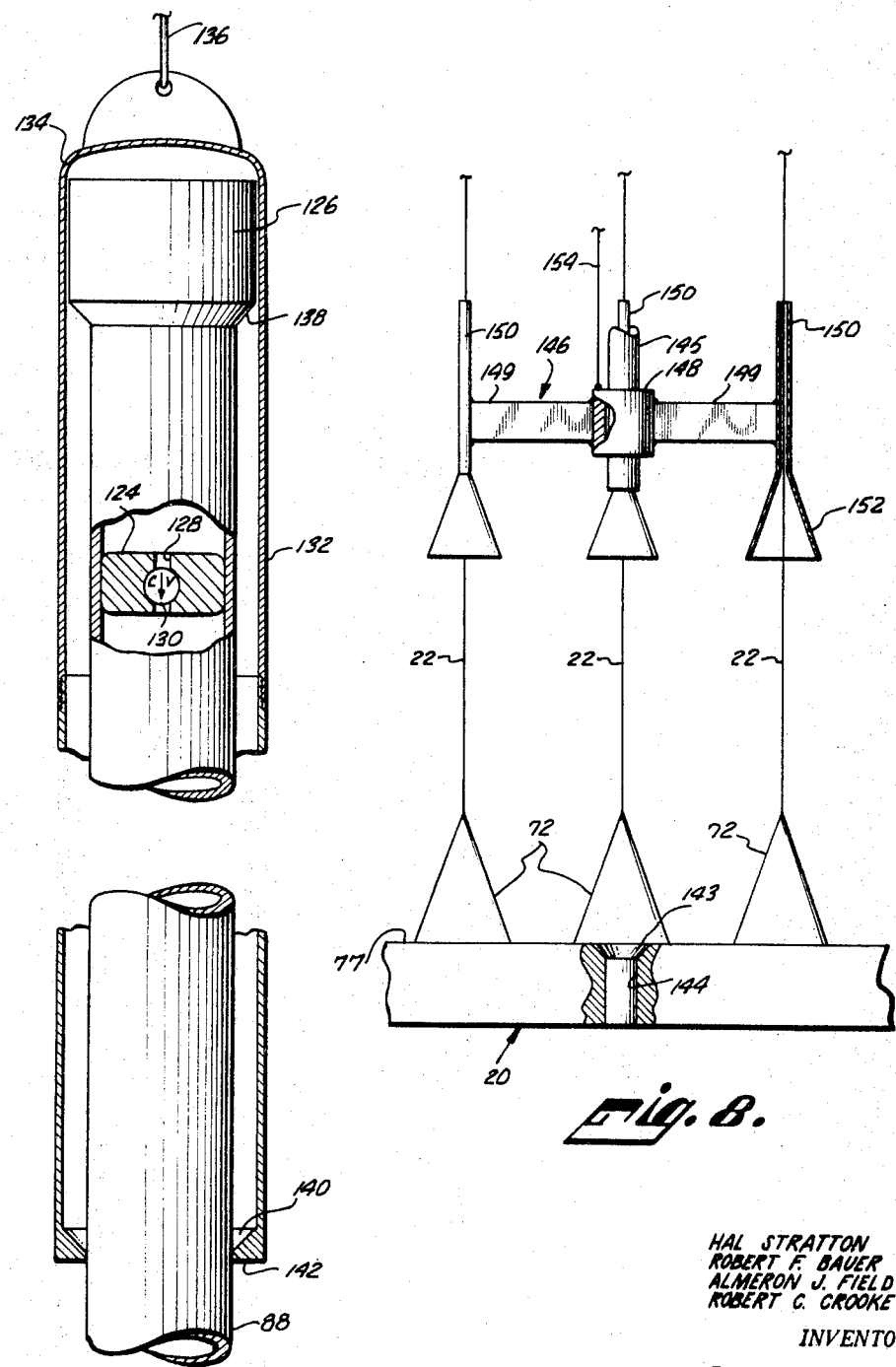

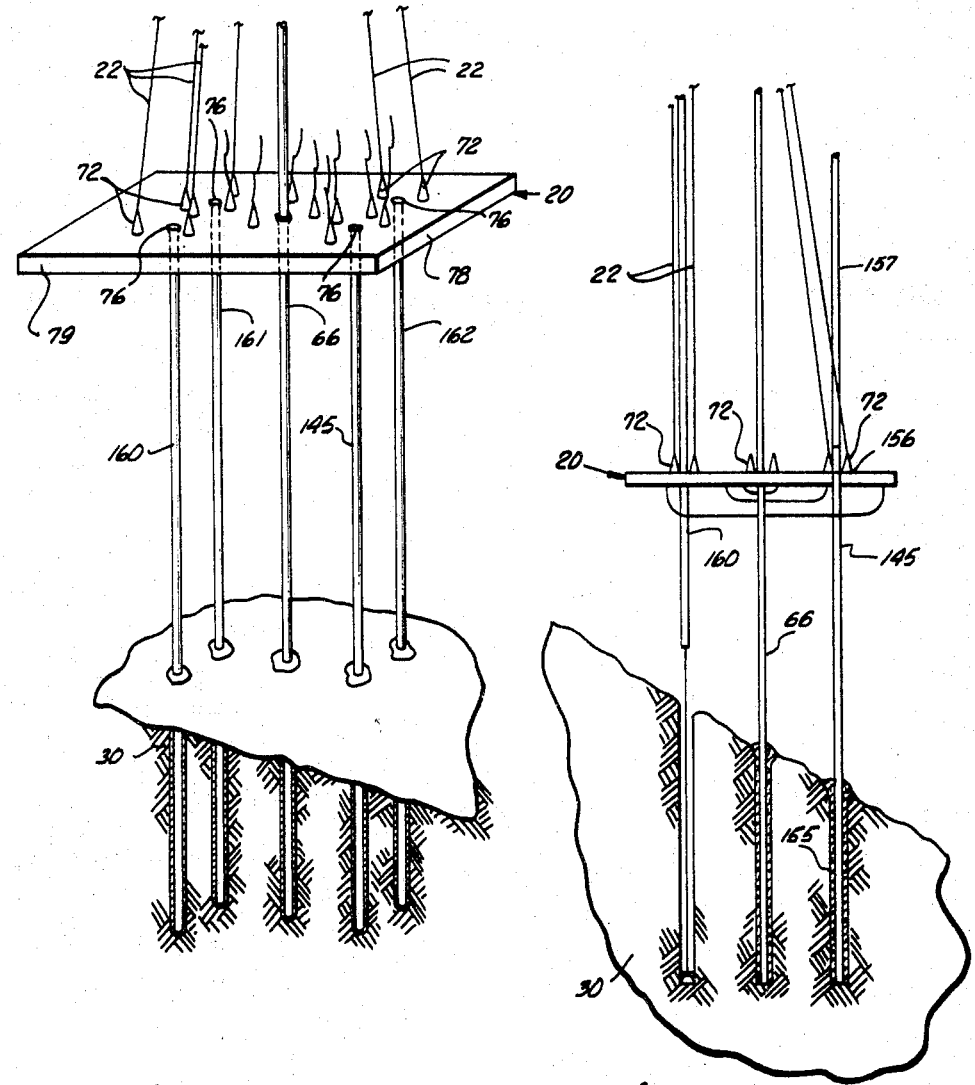

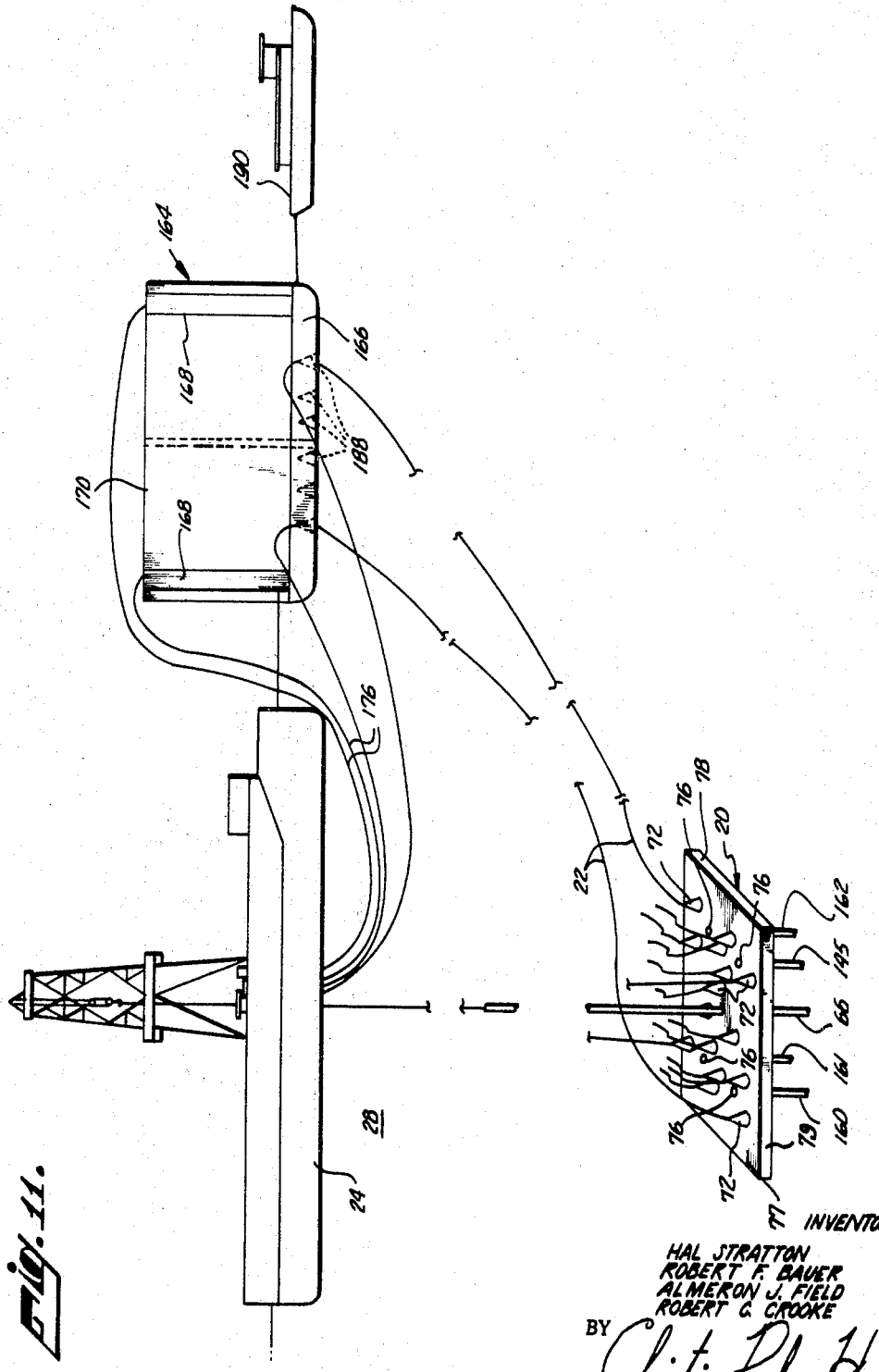

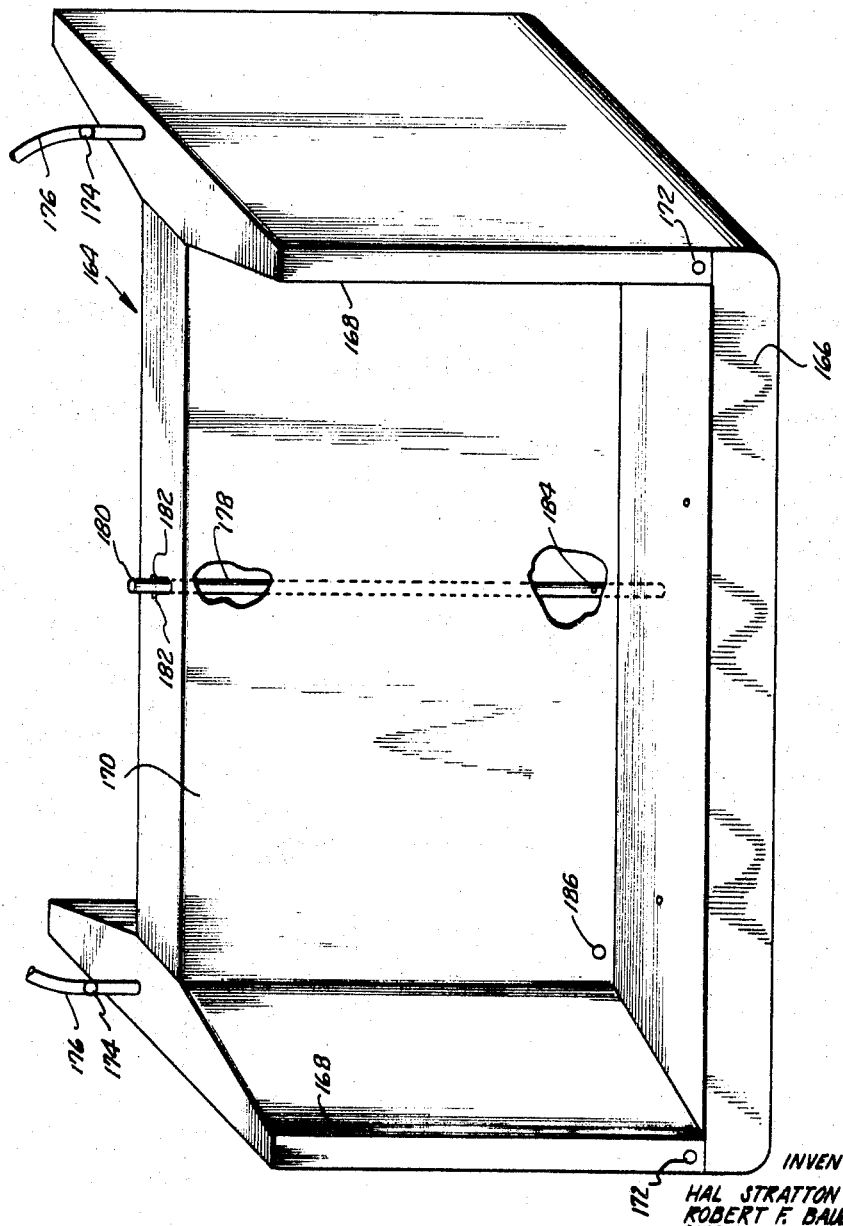

Dec. 7, 1965   H. STRATTON ETAL   3,221,506
SUPPORT STRUCTURES
Original Filed April 27, 1959   13 Sheets-Sheet 9

HAL STRATTON
ROBERT F. BAUER
ALMERON J. FIELD
ROBERT C. CROOKE
INVENTORS

BY
ATTORNEYS.

Dec. 7, 1965   H. STRATTON ETAL   3,221,506
SUPPORT STRUCTURES
Original Filed April 27, 1959   13 Sheets-Sheet 10

HAL STRATTON
ROBERT F. BAUER
ALMERON J. FIELD
ROBERT C. CROOKE
INVENTORS

BY Christie, Parker & Hale
ATTORNEYS.

Dec. 7, 1965    H. STRATTON ETAL    3,221,506
SUPPORT STRUCTURES
Original Filed April 27, 1959    13 Sheets-Sheet 11

HAL STRATTON
ROBERT F. BAUER
ALMERON J. FIELD
ROBERT C. CROOKE
INVENTORS

BY Christie, Parker & Hale
ATTORNEYS.

Dec. 7, 1965  H. STRATTON ETAL  3,221,506
SUPPORT STRUCTURES

Original Filed April 27, 1959  13 Sheets-Sheet 12

HAL STRATTON
ROBERT F. BAUER
ALMERON J. FIELD
ROBERT C. CROOKE
INVENTORS

BY Christie Parker & Hale
ATTORNEYS.

Dec. 7, 1965    H. STRATTON ETAL    3,221,506
SUPPORT STRUCTURES
Original Filed April 27, 1959    13 Sheets-Sheet 13

HAL STRATTON
ROBERT F. BAUER
ALMERON J. FIELD
ROBERT C. CROOKE
INVENTORS

BY Christie, Parker & Hale
ATTORNEYS.

United States Patent Office 3,221,506
Patented Dec. 7, 1965

3,221,506
SUPPORT STRUCTURES
Hal Stratton, Los Angeles, Robert F. Bauer, Whittier, Almeron J. Field, Portuguese Bend, and Robert C. Crooke, Corona del Mar, Calif., assignors, by direct and mesne assignments, to Shell Oil Company, Los Angeles, Calif., a corporation of Delaware
Continuation of application Ser. No. 809,024, Apr. 27, 1959. This application Apr. 16, 1964, Ser. No. 360,807
11 Claims. (Cl. 61—46.5)

This invention relates to underwater platforms for supporting submerged equipment. This application is a continuation of our co-pending application Serial No. 809,024, filed April 27, 1959, now abandoned.

The invention provides both method and apparatus for supporting underwater equipment on completely submerged platforms located in bodies of water which may vary in depth from relatively shallow to several thousand feet. One important use of such platforms is the supporting of electronic and sonar gear used for the detection of submarines. For such detection equipment to be of maximum benefit, the supporting platform often must be located many miles offshore, and consequently be supported in water which may be thousands of feet deep, where pile driving is impractical. Moreover, the platform must be accurately located and securely maintained at a depth of only a few hundred feet, so that in very deep water its supporting elements may have to be thousands of feet long. This invention provides both method and apparatus for erecting such platforms in water of practically unlimited depth.

In one form, the invention contemplates apparatus for supporting equipment uner a body of water overlying an earth formation which includes a buoyant platform completely submerged below the water surface and disposed on or above the formation. A downwardly extending leg is attached to the platform, and firmly anchored at its lower end to the formation. The platform has enough positive buoyancy to support any normal load which may be applied to it, and avoid any tendency for the leg to buckle, even though the leg may be extremely long compared to its cross section.

In the preferred form of the invention, a plurality of downwardly extending legs are used to hold the platform in place. The platform also includes guide means extending toward the water surface so that an equipment support can be guided to and from the platform and disposed on it in an accurately known orientation.

In terms of method, the invention contemplates erecting apparatus for supporting underwater equipment in a body of water overlying an earth formation. The method includes the steps of supporting a drilling rig over the formation, drilling a hole in the formation with the drilling rig, and disposing the lower end of an upwardly extending leg in the hole so that the lower end of the leg extends a substantial distance down into the hole. The leg is firmly anchored in the hole, say by cementing, or permitting the hole to collapse around the leg, and a completely submerged platform with positive buoyancy is secured to the leg.

In the preferred method, the platform includes a plurality of laterally spaced holes. A separate hole is drilled from a floating vessel in the formation through each of the holes in the platform. A separate leg or casing is disposed in each of the platform holes and secured at its upper portion to the platform and its lower end in a respective hole in the formation.

These and other aspects of the invention will be more fully understood from the following detailed description in which:

FIG. 4 is a view taken on line 4—4 of FIG. 3;

FIG. 5 is a view of the platform lowered to its final position with a first platform leg or casing being cemented in the formation;

FIG. 6 is a schematic elevation showing the completed installation of the first leg and the beginning of the installation of a second leg for the platform;

FIG. 7 is an enlarged sectional view, partially broken away, taken on line 7—7 of FIG. 6;

FIG. 8 is an enlarged view of the area enclosed by line 8—8 of FIG. 6;

FIG. 9 is a schematic elevation of the platform with the second leg in place and the hole for a third leg being drilled;

FIG. 10 is a perspective view of the platform completely installed with five legs in place and with guide lines extending to the floating vessel;

FIG. 11 is a schematic elevation of the initial step of locating a buoyant and submersible equipment support on the underwater platform;

FIG. 12 is a perspective view of the equipment support;

Figure 1:
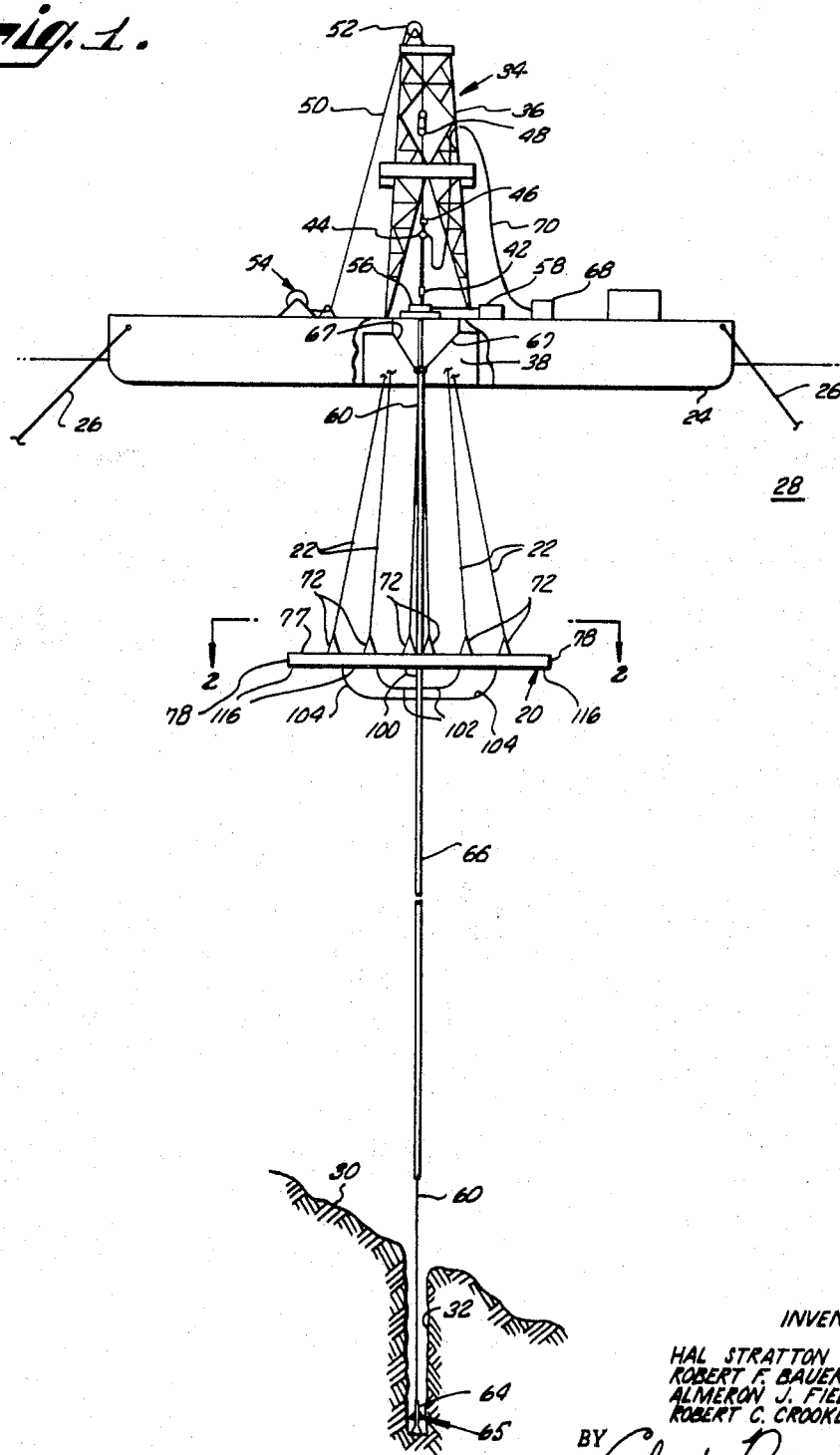
FIG. 1 is a schematic elevation of the platform supported under a floating vessel from which an initial hole is being drilled into the formation through the center of the platform.

Referring to FIG. 1, a compartmented platform 20 is suspended by guide cables 22 under a floating drilling barge 24 anchored by anchor lines 26 in a body of water 28 over an earth formation 30 in which a hole 32 is being drilled from the floating vessel.

A drilling rig 34 mounted on the floating barge includes a derrick 36 located over a cellar or center well 38 opening out the bottom of the barge. A drill pipe string includes a kelly joint 42 connected at its upper end to a swivel 44 supported by a hook 46 attached to a traveling block 48 which is in turn supported by a hoisting cable 50 disposed over a crown block 52 at the upper end of the derrick and connected to a drawing works 54 on the deck of the floating barge. The kelly joint extends down through a rotary table 56 which is revolved in a horizontal plane by a rotary table power unit 58 mounted on the derrick floor.

The lower end of the kelly joint 42 is connected to a downwardly extending length of drill pipe string 60 made up of individual sections of drill pipe coupled together in conventional fashion and extending down into the hole. A drill collar 64 and underreamer bit 65 on the lower end of the drill pipe string are used to form the hole to a diameter slightly larger than the outside diameter of a downwardly extending casing or pipe 66 disposed coaxially around the drill string. The casing is supported at its upper end by a pair of casing lines 67, or by other conventional means such as a casing spider (not shown). Each casing line is releasably attached at one end to the casing and at the other end to a respective winch (not shown) in the floating barge.

Sea water is circulated from a pump 68 through a hose 70 connected to the swivel. The sea water flows down the kelly and out the lower end of the drill string 60 so that cuttings formed by the rotating bit and underreamer are washed back up out of the hole 32 and onto the ocean floor.

To begin the operation shown in FIG. 1, the buoyant compartmented platform 20 is towed into close proximity of the floating barge, which is moored with the anchor lines over the desired location for the platform. The anchor lines permit the vessel to pitch and roll due to wave action, and to move in a limited orbit due to wind and current. The guide lines 22 are extended from constant tension winches (not shown, but located under the derrick in the floating barge) down through the center well of the barge and attached to guide cones 72 connected to the upper side of the buoyant platform. As shown most clearly in FIG. 2, there are five sets of guide cones with three cones in each set disposed equiangular around five separate sleeves 74 and seats 76 permanently fixed to the platform 20 and extending vertically through the platform in a 5-spot pattern.

Figure 2:
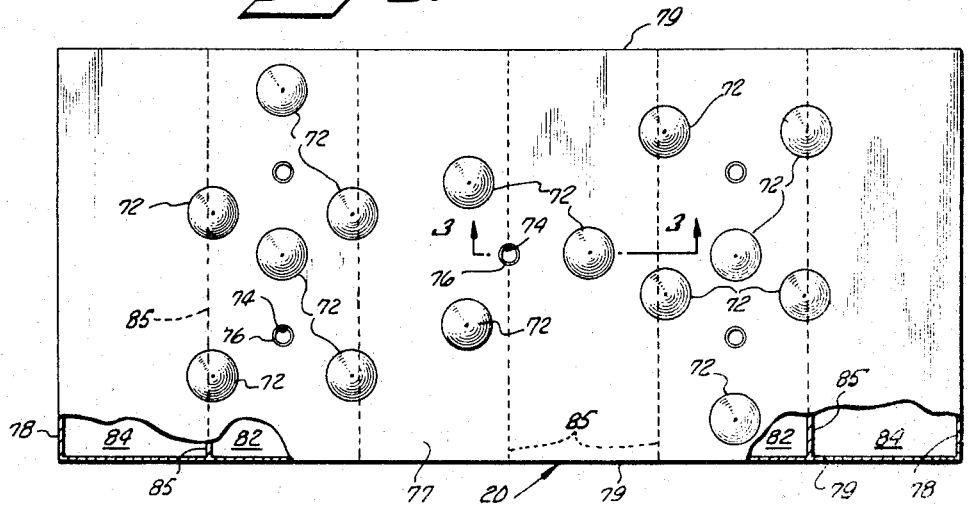
FIG. 2 is an enlarged plan view of the platform of FIG. 1.
Figure 3:
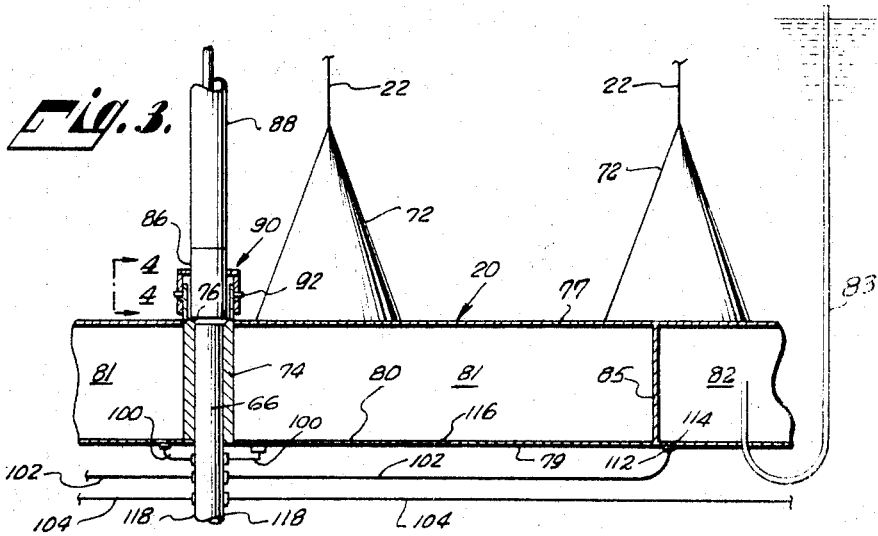
FIG. 3 is a view, partly in section, taken on line 3—3 of FIG. 2.

As shown in FIGS. 2 and 3, the platform includes a rectangular flat top 77, a pair of end walls 78, a pair of side walls 79, a bottom 80, a pair of central tanks 81, a pair of intermediate tanks 82, and a pair of outer tanks 84. The tanks are separated by downwardly extending vertical partitions 85 welded along their edges to the underside of the platform top, and at their ends to the side walls of the platform.

The platform 20 is towed adjacent the floating barge, and submerged and kept level by selectively flooding the compartments until it has a slight negative buoyancy, the weight of the submerged platform being taken on the guide lines 22 connected to the winches on the floating barge. Air is most conveniently released from a compartment by placing one end of a U-shaped tube 83 in the trapped air space of a compartment through the vent hole 16 in the platform bottom 80 and keeping the other end of the tube at a suitable elevation (say at the water surface) to permit air to be displaced. Once negative buoyancy of platform 20 has been obtained by bleeding air from compartments 81, 82 and 84 through tube 83, the tube is withdrawn from the compartment. The U-shaped tube 83 is operated and positioned from the barge 24. The vertical position of the open end of the reversely bent portion of the tube 83 determines the level to which water will rise in the compartment in which the tube is engaged.

Using a guide system which is described below, or using a diver standing on the platform, which is located at a relatively shallow depth below the floating barge, say about 50 feet, the lower end of a length of a first casing 66 is stabbed from the barge through the center guide sleeve 74 in the platform. Alternatively, the casing can be guided through the sleeve by manipulation from the barge, if the platform is raised sufficiently close to the bottom of the barge to permit visual observation. The initial casing may be of any suitable size, say 16″ in diameter, and preferably making a close sliding fit in the sleeve. Additional sections of 16″ casing are screwed onto the upper end of the casing to form the first casing string or leg, and the casing string is run to within a few feet of the ocean floor, and hung or suspended by the casing lines 67 from the floating barge. The drill string, drill collars and underreamer bit are made up, run through the casing, and drilling of the desired amount of hole 32 is commenced using ocean water as a circulating fluid to wash drill cuttings out of the hole 32 back onto the ocean floor.

After sufficient hole has been drilled to receive the required amount of casing, say 800–1000 feet, the upper end of drill pipe 60 is disconnected from the kelly joint at the floating barge, and a swage 86, say 16″ x 18″, on the lower end of a joint 88 of a secondary or 18″ casing is stripped down over the drill pipe and screwed onto the upper end of the 16″ casing 66 which is suspended below well 38 by cable 67. The drill string 60 temporarily is left standing in hole 32. The string of 16″ casing then is lowered from the vessel through platform 20 toward the hole and the swage 68 is lowered toward platform 29, using the drill pipe 60 as a guide. The drill pipe 60 is withdrawn from the hole after additional 18″ casing is added to permit the casing string 88 to be lowered to a point adjacent the top 77 of platform 20 where a J-slot setting tool 90 on the exterior of the swage 86 can be engaged with four outwardly extending lugs 92 welded 90° apart on an upwardly extending cylindrical mandrel 94 welded at its lower end around the central sleeve of the platform. When the setting tool 90 is engaged with mandrel 94, the lower end of the 16″ casing 66 is disposed in the mouth of the hole 32. The platform is later lowered with respect to the barge according to a procedure to be described below; in lowering the platform the casing 66 is introduced into hole 32.

Referring to FIG. 4, the setting tool 90 includes a cylindrical skirt 96 with an annular top 98 welded to the skirt and swage. Four inverted J-slots open out of the lower edge of the skirt 90° apart.

The casing string 66 and 88 is lowered, until the lower edge of the skirt 90 rests on the lugs. The casing string 66, 88 is then slowly rotated in a counterclockwise direction (as viewed from above) until the open end of each slot is over a respective lug. The skirt and casing string then drops a short distance, and further rotation of the casing brings the closed end of each slot against a respective lug. The casing is then lifted to lock the skirt and mandrel together as shown in FIG. 4. In this manner, the weight of the platform is transferred from the guide line supports 22 to the casing string 88, which is suspended at its upper end by elevators (not shown) hung from the derrick.

While the platform is still suspended a relatively shallow distance below the floating barge with the casing 88 locked thereto, a diver is lowered to connect the casing string 66 to the central, intermediate, and outer tanks 81, 82 and 84 of the platform with a pair of first air hoses 100, a pair of second air hoses 102, and a pair of third air hoses 104, respectively. The lower and inner end of each of the first air hoses has a nipple 106, which is screwed into a threaded opening 107 in the 16″ casing string 66 just below the platform. The lower and inner ends of the second pair of hoses each have a respective nipple 108 screwed into each of a pair of second threaded openings 109 below the first opening in the casing, and the lower and inner ends of the third pair of air hoses each have a respective nipple 110 screwed into each of a pair of third threaded openings 111 in the casing below the second pair. The outer and upper end of each air hose is connected to its respective compartment by a nipple 112 screwed into a respective threaded hole 114 in the platform bottom underlying each compartment. Each nipple 112 includes a check valve which permits air to flow only toward the adjacent compartment. Each compartment also includes a respective venting hole 116 in the tank bottom so that each compartment is, in effect, open-bottomed. (It is through the vent holes 116 that the U-shaped tube 83 is engaged when the platform is initially flooded into a condition of negative buoyancy.) The casing 66 also includes a pair of purging ports 118 located below the pair of third openings 111. As mentioned above, the reversely bent portion of the U-shaped tube 83 is introduced into the compartment through vent holes 116 in order to initially place the platform 20 in a negatively buoyant condition.

Figure 3A:
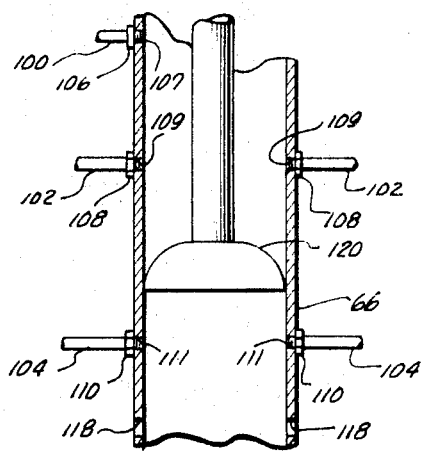
FIG. 3A is an enlarged sectional view of a portion of the apparatus shown in FIG. 3 as directly under the platform.
Figure 13:
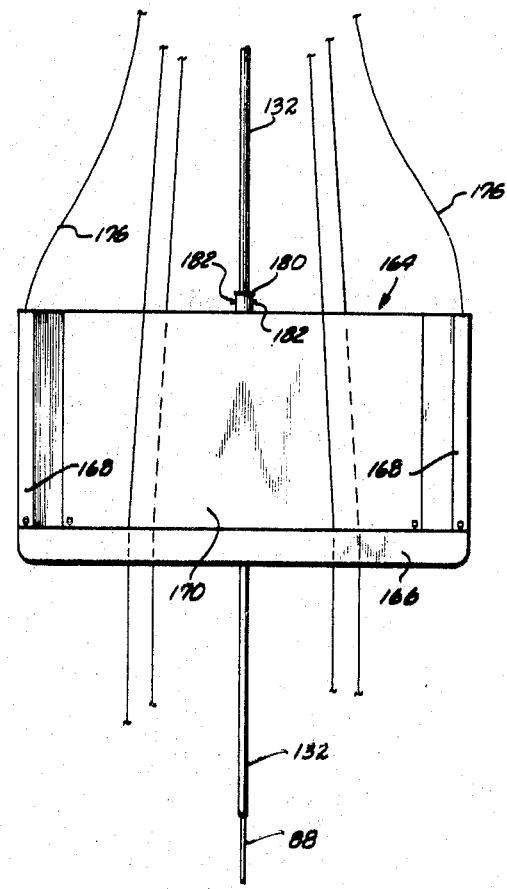
FIG. 13 is an elevation of the equipment support being lowered toward the platform.
Figure 14:
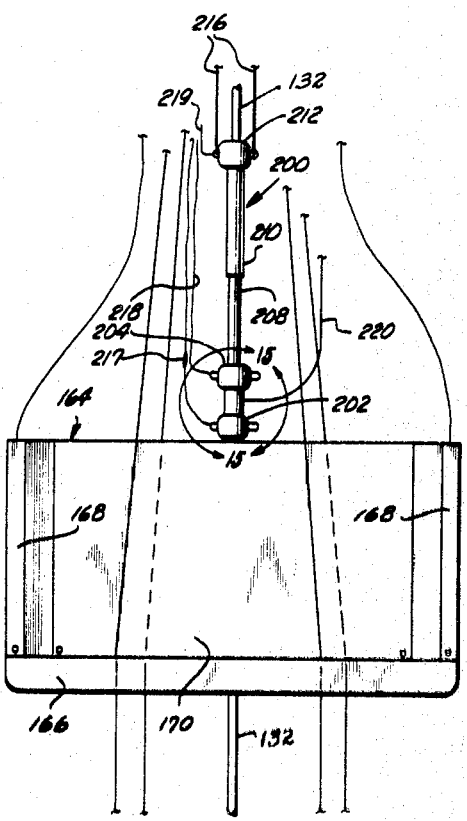
FIG. 14 is an elevation of the equipment support and a compressed air supply means used in lowering the support to the platform.
Figure 15:
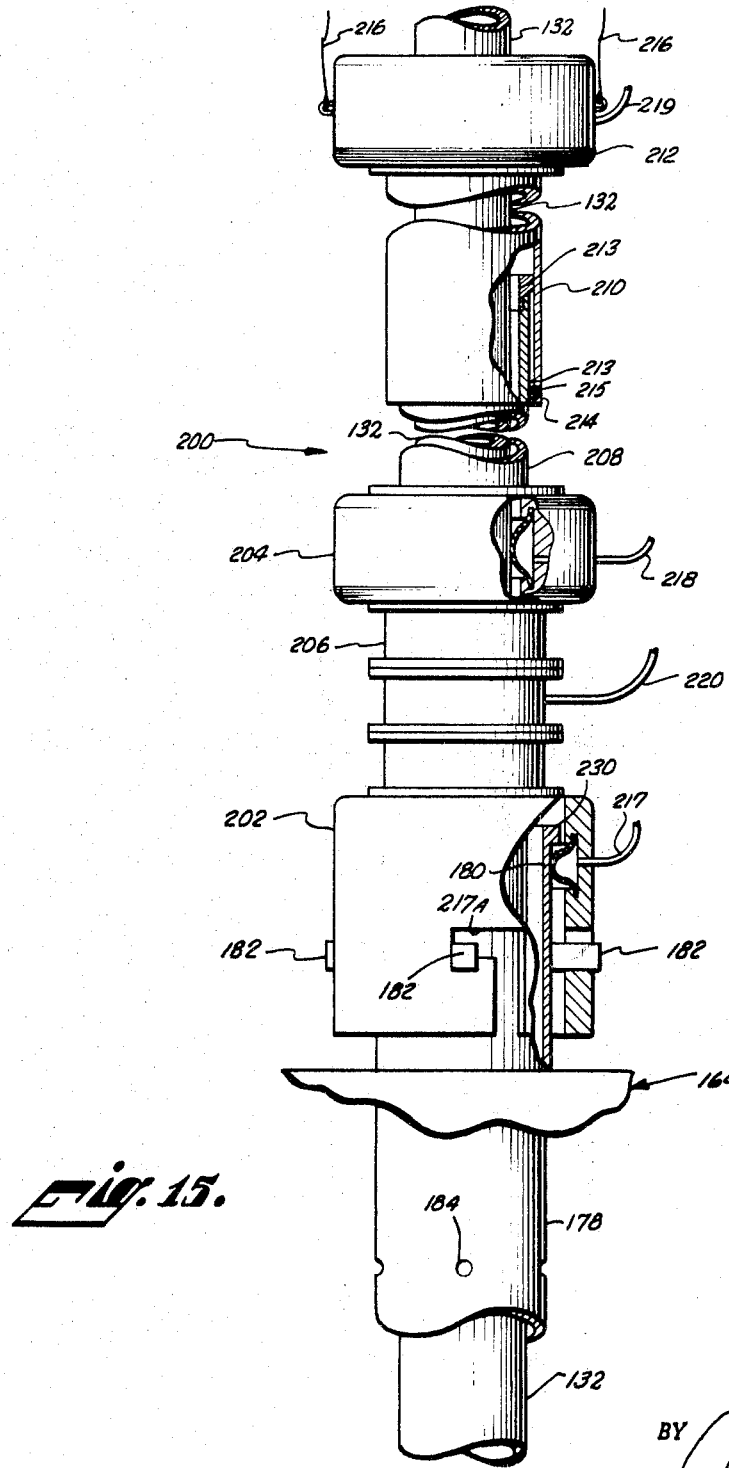
FIG. 15 is an enlarged view, partly broken away, taken within the area of line 15—15 of FIG. 14.

The entire assembly of casing 66, 88 and platform 20 is lowered into place by making up additional joints of 18" casing 88 on the floating barge. During lowering of platform 20, casing 66 is stabbed into hole 32. Lowering is done after air lines 100, 102 and 104 have been connected to casing 66. If the block load on the derrick becomes excessive due to the additional sections of casing 88 added to the casing string, the lowering process is temporarily halted, and air is pumped down the casing to force pressurized air out the air lines 100, 102 and 104 to displace water from the platform compartments through the vents 116 and thereby reduce the load on the derrick block. If desired, a swab cup 120 may be connected on the lower end of a string of drill pipe 60 which is reinserted into casing 88 as shown in FIG. 3A to control the point of entry of air into the platform compartments to stabilize the platform, the drill pipe 60 having been withdrawn from casing 66 and 88 after the process of adding lengths of casing 88 to engage swage 86 with mandrel 94. As shown in FIG. 3A, a swab cup 120 is positioned to permit compressed air, pumped down through casing 66 and 88, to enter air lines 100 and 102. Escape of compressed air from the compartments is prevented by the presence of the check valves and nipples 112.

After the platform 20 has been lowered to the desired depth below the surface of the water to position the lower end of casing 66 in hole 32, the swab cup is run in on the lower end of the drill pipe to a position above purging ports 118 in the 16" casing but below the third set of air ports. The first leg or string of casing is then cemented by pumping cement 122 (shown in FIG. 5) through the length of drill string 60 mounting swab cup 120, out the lower end of the casing 66 and up the annular space between the casing 66 and the hole 32. After the casing 66 has been cemented in place sufficient to maintain its final position, say as shown in FIG. 5, with its lower end resting in the bottom of the hole 32, the casing 88 is set in slips (not shown) at the main deck level, the drill string 60 and swab cups 120 are removed from casing 88, and sufficient air is pumped into the platform 20 so that it has sufficient buoyancy to hold the casing string in an erect and upright position.

A casing packer or plug 124 (FIG. 7), which may be of conventional oil field design, is set approximately 200 feet below the water surface in the 18" casing just below a backoff joint 126 in the second string of casing 88. The backoff joint is made up of left-handed threads while the remaining joints of the casing string 88 are right-hand threads. The casing packer has a vertical conduit 128 through it with a check valve 130 in it to permit air to be pumped down through the packer but prevent air from flowing up the other direction. Using a suitable packing arrangement (not shown) at the upper end of the casing 88, water is displaced out the purging ports 118 by pumping compresed air down the upper end of the 18" casing until the casing has adequate buoyancy to maintain itself in an upright position. The 18" casing above the backoff joint 126 is then removed.

Approximately 250 feet of 24" diameter casing 132 is stripped down over the 18" casing. The upper end of the 24" casing is closed with a cap 134, which is secured to a hoisting line 136. The remainder of the 24" casing is then lowered down over the 18" casing until it comes to rest as shown in FIG. 7. The upper end of the hoisting line is secured to a marking buoy 138, which floats on the water surface for easy location and retrieving of the 24" casing. The guide lines 22 are kept slack and the first leg is held upright by its own buoyancy and by the buoyancy of the platform while the cement sets independent of any movement of the floating barge.

As shown in FIG. 7, the backoff joint includes an upwardly and outwardly extending tapered section at its lower end 138, which matches a similar section 140 on the upper end of an inwardly extending annular lip 142 on the lower end of the 24" casing. To facilitate the stripping of the 24" casing down the 18" casing, as described above, the lower end of the 24" casing is disposed around the 18" casing before the backoff joint is made up in the 18" casing. Thereafter, the backoff joint is added, and additional sections of 18" and 24" casing are added as the platform is lowered to the positions shown in FIGS. 5 and 6.

As shown in FIG. 6, after setting the first platform leg, the barge is then moved approximately 25 feet to the right to be directly above a second casing seat 143 and sleeve 144 in the platform (see FIG. 8). If the platform, now in its lower and permanent position, is at a depth too great for divers, the second leg or string of 16" casing 145 is run in with a guide assembly 146 as shown in FIG. 8. The assembly includes a guide sleeve 148 with three radially extending horizontal arms 149 (only two of the arms are visible in FIG. 8) attached to it. The outer end of each arm is connected to an upright pipe 150. A separate hollow cone 152, each open at its upper and lower end, is welded to the lower end of a respective pipe, and a separate guide line is disposed through each one of the pipes. The lower end of a second leg or string of casing is placed in the casing guide sleeve 148 on the drilling barge, and then the guide assembly and lower end of the casing are lowered as shown in FIG. 8. The three cones on the guide assembly 146 seat on the three matching cones around the second sleeve 143 on the platform, and center the guide assembly sleeve and lower end of the casing directly over the second seat and sleeve. The 16" casing 145 is then lowered through the platform until it is within a few feet of the ocean bottom. Then the casing guide assembly is pulled back to the surface by a wire line 154 attached to the sleeve 148. The identical drilling tools described previously, including a drill string 60, are then run through the second casing, and a second hole 155 (see FIG. 9) is drilled and underreamed as previously described, a joint of casing 145 being added to the second casing string for the initial stabbing of the second casing string in the second hole 155. The drill pipe is then withdrawn. A second string of 18" casing 157 is made up and lowered to a point where a swage 156 is landed in the second casing seat 143 on the sleeve 144 of the platform. Swab cups on a drill pipe are lowered in the second 16" casing 145, which extends to the floating vessel, to a point past the swage, and the second string of 16" casing 145 is cemented as previously described. If desired, concentric strings of casing as required can be set to minimize maximum fiber stress in the legs. Upon the completion of the setting of these concentric strings, the excess casing above the platform is backed off at the deck of the platform (see FIG. 10) by the means of a backoff joint (not shown) located just above the swage. The vessel is then moved to start a hole for the third leg or third string of casing 160 as shown in FIG. 9. Connection between the buoyant platform 20 and the second cemented casing 145 is maintained between the swage 156 and slot 143.

The foregoing is repeated for the third, fourth, and fifth strings of casing 160, 161, 162, respectively, so that the final platform installation with five legs is as shown in FIG. 10.

The platform is now ready to receive an equipment array support 164 as shown in FIGS. 11, 12, 13, 14, 15 and 16. The specific equipment (not shown) carried by the support is not a part of this invention, and therefore is not described.

The equipment array support includes a rectangular horizontal flat base 166, a separate vertical side tank 168 mounted on the top of the base at each of the sides of the base, and a vertical center tank 170 disposed between the two side tanks so that in plan view the tanks are in the configuration of an "H". Each of the side tanks includes a lower valve 172 in its lower portion and an upper valve 174 at its upper portion. A separate combination air hose and hoisting cable 176 is connected to each upper valve on each side tank. A vertical sleeve 178 extends down through the central portion of the center tank and the base. The upper end of the sleeve projects a short distance above the top of the center tank to serve as a mandrel 180. A pair of outwardly extending lugs 182 are welded to the lower portion of the mandrel at diametrically opposed locations. The lower portion of the sleeve has perforations 184 opening into the central tank, which also includes opening 186 in its lower left-hand corner as viewed in FIG. 12 so that the center tank is in effect an open-bottom tank.

The bottom of the base includes fifteen vertical openings 188 through it, the lower end of each of the openings being disposed and flared outwardly to have a conical form to mate with a repective cone 72 on the platform.

The equipment support is towed by a tug 190 to within close proximity of the floating barge as shown in FIG. 11, the tanks on the support base being full of air so that the equipment support has positive buoyancy.

The guide lines 22 are each strung through a respective opening in the support base as shown in FIG. 11, and then led back to a respective constant tension winch (not shown) on the floating barge. The separate respective air hoses and hoisting cables are run from the underside of the floating barge to the upper valves 174 on each of the side tanks of the equipment support. The equipment support is then submerged and swung to position aproximately 100 feet under the barge by selective flooding of the buoyant chambers. This is accomplished by opening upper valves 174 in the air hoses and opening lower valves 172 in the bottom of the side tanks. The side tanks are completely filled with water, and the air trapped in the center tank is compressed to a reduced volume so the support has a negative buoyancy. The support sinks and swings directly under the floating barge, where it is held by the combination air lines and cables.

The marker buoy 138 is removed from the line 136, which is then passed up through the sleeve 178 in the equipment support, and the 24" casing is then pulled up through the sleeve in the equipment support. A sliding joint assembly 200 (see FIG. 14) is stripped down over the 24" casing 132. The sliding joint assembly (shown in detail in FIG. 15) includes a lower blow-out preventer 202 on its lower end, an intermediate blow-out preventer 204 connected by a conduit 206 to the upper end of the lower blow-out preventer, a lower tube 208 connected at its lower end to the intermediate blow-out preventer, and slidably disposed in an upper tube 210 to form a slip joint, and an upper blow-out preventer 212 on the upper end of the upper tube. The mating ends of the lower and upper tubes have annular internal stops 213 to prevent them from coming apart when the slip joint is placed in tension. An "O" ring 214 in an annular groove 215 in the stop in the lower end of the upper tube makes a high pressure sliding seal against the lower tube. The upper blow-out preventer is supported by a pair of slip joint cables 216. The lower blow-out preventer is actuated through a first control line 217 to seal on the mandrel 180 above the top center tank on the equipment support. The lower end of the lower blow-out preventer has inverted J-slots 217A opening out its lower edge to fit on the mandrel lugs 182 and mechanically lock the slip joint assembly to the equipment support, as decribed for the system shown in FIG. 4. The intermediate and upper blow-out preventers are actuated through control lines 218, 219, respectively, to seal against the 24" casing. An air supply line 220 is connected to the conduit between the intermediate and lower blow-out preventers.

Figure 16:
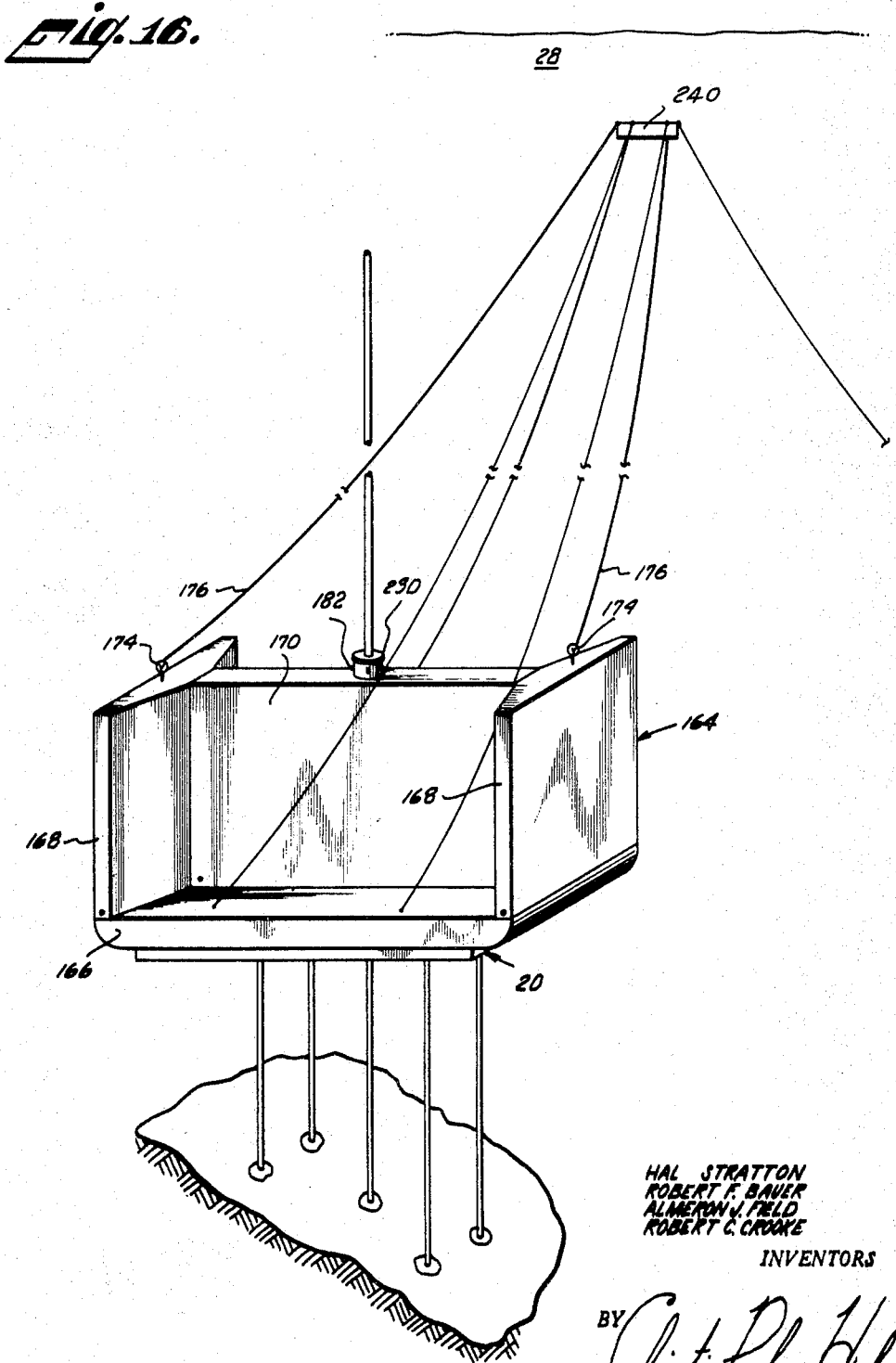
FIG. 16 is a perspective view of the equipment support located on the platform and left by the floating vessel.

The equipment array support is lowered in successive steps by the use of the derrick traveling blocks to handle the slip joint assembly suspension cables 216 and the combination air and support cables 176 for the support. Before each increment of lowering, the sliding joint is collapsed by releasing the upper blow-out preventer from its seal against the 24" casing 132. Then the upper blow-out preventer is sealed on the 24" casing by charging preventer 212 with compressed air through line 219 with the slip joint collapsed. The intermediate blow-out preventer 204 is then released from engagement with the 24" casing 132 by releasing the compressed air charge of the preventer, and as the support cables on the equipment array support are payed out, the slip joint extends because of the negative buoyancy of the support 164. During the increment of lowering, the air volume of the support is held constant by continually pumping air into the center of the tank 170 to compensate for the loss of air volume due to the increasing hydrostatic head and due to water which enters tank 170 as the slip joint 200 is operated. As shown best in FIG. 15, the air is supplied to the center tank as the support is lowered by supplying air under increasing pressure through the air hose 220. The air flows down the annular space between the 24" casing and the sleeve 178 in the support. The air then passes out the ports 184 opening into the bottom of the central tank. The water displaced from the central tank flows out through the opening 186 in the bottom corner of the tank. When the slip joint is fully extended, the intermediate blow-out preventer is sealed against the 24" casing by air-charging preventer 204 via line 218, and the slip joint again collapsed by releasing the air-charge in upper preventer 212, as explained above. By this means, the array support is safely controlled and landed on the tension casing platform as shown in FIG. 16. Each conical recess in the bottom of the equipment support mates with a corresponding cone on the platform to guide the support into an accurately reproducible position.

When the equipment array support is landed in the position shown in FIG. 16, the blow-out preventers are then released and the slide joint assembly is pulled to the surface after lower blow-out preventer 202 is released from lugs 182. The air in the center tank does not escape when the blow-out preventers are disconnected because the ports leading from the central tank sleeve into the central tank are located at the bottom of the tank below the water level in the tank. For situations where change of negative buoyancy due to air dissolving in the water may present a problem, another light fluid is used instead of air in the tanks of both the platform and the equipment array support. Oil, or a gas such as methane, which has a lower solubility in water, may be used. Another precautionary measure to insure maintenance of the proper negative buoyancy is the periodic pumping of fresh fluid into the tanks of the platform and equipment support. The platform tanks 81, 82, 84 are proportioned so that with all the platform tanks full of air, the upward buoyant force of the platform is insufficient to rupture the platform legs or to pull them from the formation. The equipment support tanks are sized so that with the side tanks flooded and the central tank full of air, the support has a negative buoyancy. The negative buoyancy of the equipment support 164 is less than the constant positive buoyancy of platform 20.

The line on the 24" casing is connected to a submerged buoy 240, and the casing is lowered to the position shown in FIG. 16. The guide lines and the combination air and lifting lines on the side tanks of the equipment support are also secured to buoy 240 which is about 50 feet or so below the water surface to be clear of seagoing traffic and yet be easily reached by a diver when necessary.

The equipment support is raised from the platform by any of several alternative procedures using any suitable barge (not shown), which has adequate mooring gear, air compressors, and lifting capacity for the load on the platform. Using a diver, the lifting cables for the support and the guide lines connected to the platform are picked up off of the submerged buoy and secured to respective winches on the floating vessel. The array support is then lifted to a point approximately 100 feet below the surface. During this lifting operation, the cable load remains constant, because the air in the center tank expands and escapes out the bottom of the tank as the support is raised. The air hoses on the barge are connected to the air hoses leading to the side tanks, which are then partly dewatered by the application of compressed air from the barge. The servicing barge is pulled off to one side, and the side tanks further dewatered so the equipment support floats to the surface.

If necessary, prior to the lifting operation, the 24" guide casing is raised and the blow-out preventers on the slip joint assembly are lowered to add make-up air to the center tank to decrease the load to be raised. This is done by lifting cable 136 from buoy 240, raising the 24" casing 132 to the surface, and then engaging a slip joint assembly 200 over the casing 132 as described above.

If there is some concern about the condition of the lifting cables, new cables are attached to the upper blow-out preventer on the guide assembly, and the slide assembly is then lowered over the 24" guide casing and latched onto the outwardly extending lugs on the mandrel at the top of the array support. The array is then lifted by the new cables.

In case cables are inadequate, the array is lifted by stripping a new string of casing (not shown) over the 24" guide casing. The lower joint of the new casing has a J-slot similar to that shown in FIG. 4, which engages the outwardly extending lugs 230 on the mandrel on the top of the array. The entire equipment array support is then hoisted by the new casing.

Figure 17:
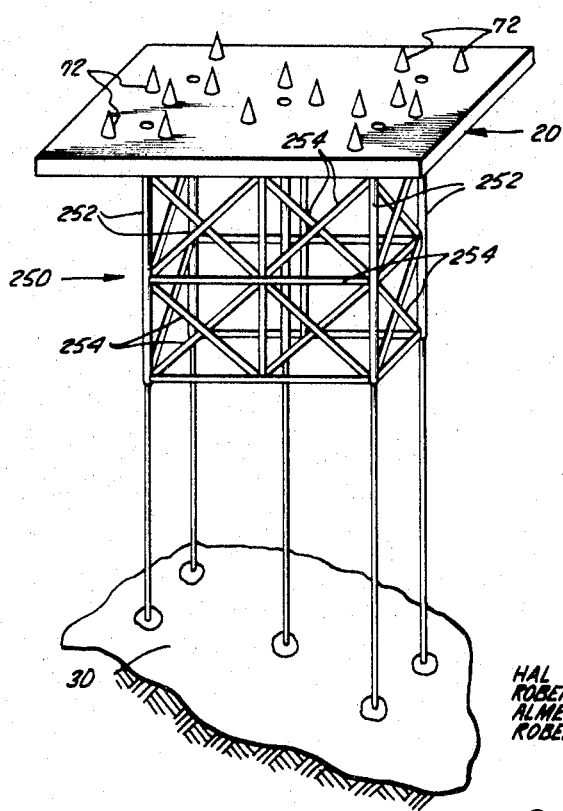
FIG. 17 is a perspective view of an alternate platform using a cross-braced jacket for additional lateral stability.

FIG. 17 shows an alternate embodiment of the invention in which a cross-braced jacket 250 is attached to the underside of the platform to increase the rigidity of the legs to which the platform is attached. The jacket includes a separate downwardly extending sleeve 252 welded to the underside of the platform around each one of the four holes spaced around the center hole of the platform. Each jacket sleeve makes a close sliding fit around the respective casing extending through it. Preferably, the lower ends of each jacket sleeve are welded to its respective casing leg. The four jacket sleeves 252 are rigidly attached to each other by cross-bracing members 254. The cross-braced jacket is attached to the underside of the platform either on the floating vessel or on shore before the platform is carried to the underwater location. The drilling of each hole for the platform legs takes place through each of the jacket sleeves with the platform suspended underneath the floating vessel as previously described. The welding, if done, of each jacket sleeve to its respective leg is done while the platform is still suspended a relatively shallow depth below the floating vessel and can readily be reached by divers. The advantage of the platform with the cross-braced jacket is that the platform has increased rigidity and resistance to lateral and torsional displacement due to underwater current action.

Figure 18:
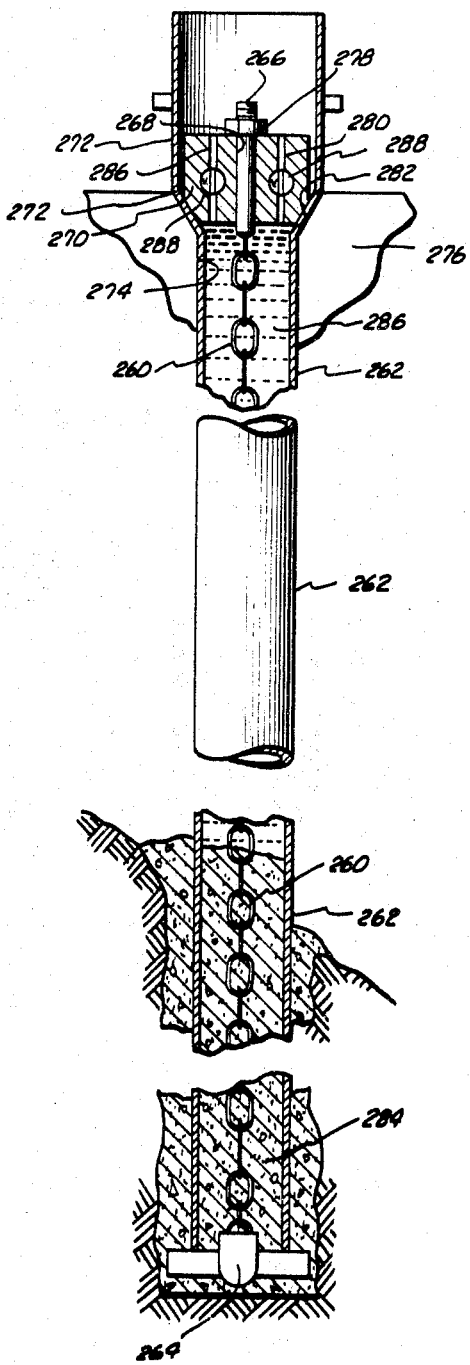
FIG. 18 is a sectional view of an alternate type of leg for anchoring the platform.

An alternate arrangement for increasing the life of the legs holding the platform is shown in FIG. 18, in which a chain 260 is coaxially disposed in the lower portion of a casing leg 262 and attached at its lower end to an anchor spider 264 disposed across the lower end of the casing leg. The upper end of the chain is attached to a vertical bolt 266 disposed in a bore 268 extending through a plug 270 having a taper on its lower end to match the internal taper of the swage 272 in the casing leg and seated in an opening 274 of the platform 276. The chain and anchor block are set in the lower portion of the casing as it is initially lowered into the hole, as previously described, and when the swage is made up into the casing leg, the plug 270 is added and a nut 278 on the upper end of the bolt is tightened to put the chain in tension, and to relieve some of the initial tension on the casing. The plug includes a plurality of vertical ports 280 through it to permit cement to be pumped down the casing (this arrangement is used for the four corner legs, which do not have air ports and purging ports as previously described for the center leg). After the swage is made up into the casing leg and additional casing sections are added above the swage, the casing is lowered to a seat 282 on the platform. A slug of cement 284 is then pumped down the casing, and followed by a column of oil 286 to displace the cement to the position shown in FIG. 18. The ports in the plug have check valves 288 to prevent upward flow and yet permit downward flow of fluid such as cement and oil. With this arrangement, the lower portion of the chain is cemented in the casing, and the upper portion of the chain is surrounded by the oil in the casing. Thus, the chain is protected against corrosion for an indefinite period, thereby greatly extending the life of the leg, because even after the leg is finally weakened by corrosion, the chain will still have its original strength. The same is true for concentric strings of casing cemented together as previously described.

Although the foregoing description is specific to the platform being spaced above the ocean floor, it will be apparent that the platform can also be disposed on the ocean floor if desired.

With the apparatus of this invention, electronic or sonic equipment on the support is accurately moved to and from a fixed position using methods and apparatus which are relatively simple and inexpensive, even in water depths of thousands of feet.

We claim:

1. A subsurface structure comprising in combination equipment of predetermined vertical height and weight for carrying out a desired function underwater, a platform, means within the platform to store fluid to give the platform a positive buoyancy in excess of its own weight and that of the equipment, means for landing and holding the equipment on the platform, and at least one vertical tubular column fastened at its upper end to the platform and anchored at its lower end in the bottom of the water body, the tubular column between the bottom and the platform being substantially shorter in length than the difference between the water depth and the combined vertical height of the equipment and the platform so that the equipment supported on the platform is at its upper extremity substantially below the surface of the water body, the tubular column being under tension in response to the positive buoyancy of the platform.

2. Apparatus according to claim 1 including guide and seat means connected to the platform and extending upwardly therefrom, an equipment support member including internal buoyancy regulating chambers and means for engaging the guide and seat means, the equipment support member having negative buoyancy of an absolute value less than the positive buoyancy of the platform when the support member engaging means are engaged with the platform guide and seat means, air conduit means connected to the buoyancy regulating chambers and extending upward therefrom to terminate at a location below the surface of the body of water, and check valve means in the air conduit means, the buoyancy of the equipment support member being alterable from a condition of negative buoyancy to a condition of positive buoyancy to raise the support member from the platform.

3. Apparatus according to claim 1 which includes a plurality of tanks in the platform, a plurality of vertically spaced conduit means connecting the leg below the platform to the tanks, and vertically reciprocable means in the leg selectively operable relative to the conduit means from a location above the water surface to admit compressed air from a source of compressed air disposed at location above the water surface to selected ones of the conduit means for regulation of the contents of the tanks.

4. A subsurface structure comprising in combination equipment of predetermined vertical height and weight for carrying out a desired function underwater, a platform, means within the platform to store fluid to give the platform a positive buoyancy in excess of its own weight and that of the equipment, at least one vertical tubular column fastened at its upper end to the platform and anchored at its lower end in the bottom of the water body, the tubular column between the bottom and the platform being substantially shorter in length than the difference between the water depth and the combined vertical height of the equipment and the platform so that the equipment supported on the platform is at its upper extremity substantially below the surface of the water body, the tubular column being under tension in response to the positive buoyancy of the platform, and a plurailty of guide cables extending from the platform toward the water surface for guiding the equipment to the platform from the surface.

5. A subsurface structure comprising in combination equipment of predetermined vertical height and weight for carrying out a desired function underwater, a platform, means within the platform to store fluid to give the platform a positive buoyancy in excess of its own weight and that of the equipment, and means for landing and holding the equipment on the platform, a plurality of vertical tubular columns fastened at their upper ends to the platform and anchored at their lower ends in the bottom of the water body, the tubular columns between the bottom and the platform each being substantially shorter in length than the difference between the water depth and the combined vertical height of the equipment and the platform so that the equipment supported on the platform is at its upper extremity substantially below the surface of the water body, the several columns each being under tension in response to the positive buoyancy of the platform.

6. Apparatus for supporting equipment below the surface of a body of water overlying an earth formation, the formation constituting the lower limit of the body of water, the apparatus comprising a hollow platform of substantially constant positive buoyancy completely submerged beneath the water surface and spaced above the formation, a hollow tensionally stressed leg having an elongate extent between spaced apart opposite ends substantially less than the depth of the body of water attached to the platform at one end thereof to extend downwardly into a hole in the formation, means for firmly sealing the other end of the leg in the hole, an elongated leg stress reducing member disposed in the leg and anchored at its lower end within the hole against upward movement and connected at its upper end to the upper end of the leg, and means connected between the leg and the upper end of the member for attaching the upper end of the member to the leg and for restraining the buoyant platform from upward movement relative to the leg in the event of leg failure.

7. Apparatus for locating and supporting equipment under a body of water overlying an earth formation, the apparatus comprising a unitary buoyant platform having contiguous buoyant portions submerged beneath the water surface and spaced above the formation, substantially entirely vertical means for spacing the platform from the formation comprising a downwardly extending leg having an elongate extent less than the vertical distance between the water surface and the formation, means for attaching the upper end of the leg to the platform in conjunction with a platform buoyant portion, means for firmly anchoring the lower end of the leg to the formation, a completely submerged negatively buoyant equipment bearing support member disposed on the platform, and means for moving the equipment support member up and down with respect to the platform, the leg constituting the sole connection between the formation and the platform.

8. Apparatus according to claim 7 including means for changing the negative buoyancy of the equipment support member during operation of the means for moving the equipment support member up and down with respect to the platform.

9. Apparatus according to claim 7 wherein the equipment support member is hollow and has its interior open to the exterior of the equipment support member at a lower portion thereof, and including means connected to a source of gas disposed above the water surface and to the support member for adding gas to the interior of the equipment support member for regulating the buoyancy of the equipment support member.

10. Apparatus for locating and supporting equipment wholly below the surface of a body of water at a location spaced above an earth formation defining the bottom of the body of water, the apparatus comprising a unitary positively buoyant hollow platform having top and bottom surface and having interior watertight partitions defining a plurality of tanks internally of the platform, each tank being open at a lower portion thereof to the exterior of the platform, a plurality of tubular sleeves extending vertically through the platform at preselected locations on the platform, each sleeve being sealed in fixed watertight relation to the upper and lower surfaces of the platform, a plurality of vertical hollow legs extending between the platform and the earth formation, each leg having an elongate extent between its upper and lower ends less than the vertical distance between the water surface and the earth formation, each leg having its upper extent disposed in a corresponding sleeve, means connecting each leg to its corresponding sleeve adjacent the upper surface of the platform to secure the platform from upward movement relative to the leg, means securing the lower end of each leg within the earth formation, one of the legs extending above the platform toward the water surface, an initially positively buoyant hollow equipment bearing support defining a plurality of watertight tanks internally thereof, each of the support tanks being open at a lower portion thereof to the extension of the support, means for flooding at least one of the support tanks to render the support negatively buoyant, a vertical sleeve extending through the support, the said one leg extending through the sleeve, means selectively operable from a location above the water surface to move the support up and down with respect to the platform, and means engageable between the platform and the support for locating the support in a predetermined position on the platform, the support having a negative buoyancy when positioned on the platform of an amount less than the positive buoyancy of the platform.

11. Apparatus according to claim 10 including selectively operable means removably connectible to the support and engageable with the said one leg for lowering the support to the platform by movement along the said one leg, the support being negatively buoyant during operation of the selectively operable means, and means connected to the at least one support tank and to a source of gas located above the water surface for admitting gas to the tank to regulate the buoyancy of the support during operation of the selectively operable means.

References Cited by the Examiner

UNITED STATES PATENTS

| | | | |
|---|---|---|---|
| 2,187,871 | 1/1940 | Voorhees | 175—8 |
| 2,476,309 | 7/1949 | Lang | 175—8 |
| 2,503,516 | 4/1950 | Shrewsburg | 61—46.5 X |
| 2,512,783 | 6/1950 | Tucker | 175—6 |
| 2,555,145 | 5/1951 | McKinney. | |
| 2,606,003 | 8/1952 | McNeill | 175—7 |
| 2,691,272 | 10/1954 | Townsend et al. | 61—46.5 X |

(Other references on following page)

UNITED STATES PATENTS

| | | | |
|---|---|---|---|
| 2,777,669 | 1/1957 | Willis et al. | 61—46.5 X |
| 2,784,559 | 3/1957 | Kajmo | 61—69 |
| 2,808,230 | 10/1957 | McNeill | 175—7 |
| 2,854,215 | 9/1958 | Cox et al. | 166—46 |
| 2,889,795 | 6/1959 | Parks | 61—46.5 X |
| 2,891,770 | 6/1959 | Bauer et al. | 175—7 |
| 2,923,531 | 2/1960 | Bauer et al. | 175—7 |
| 2,988,892 | 6/1961 | Borrmann | 61—53.62 X |
| 3,001,370 | 9/1961 | Templeton | 61—46.5 |

OTHER REFERENCES

The Oil Weekly (publication), February 1947, pp. 33–35.

The Oil & Gas Journal (publication), October 1957, pp. 100–101.

EARL J. WITMER, *Primary Examiner.*

JACOB SHAPIRO, *Examiner.*